(12) United States Patent
MacKenzie

(10) Patent No.: US 8,382,061 B1
(45) Date of Patent: Feb. 26, 2013

(54) D.I.Y. (DO IT YOURSELF) MONUMENT MOLD

(76) Inventor: Kenneth Lee MacKenzie, Bella Vista, AR (US)

( * ) Notice: Subject to any disclaimer, the term of this patent is extended or adjusted under 35 U.S.C. 154(b) by 0 days.

(21) Appl. No.: 12/590,921

(22) Filed: Nov. 17, 2009

(51) Int. Cl.
*B28B 7/24* (2006.01)

(52) U.S. Cl. ......... 249/121; 249/122; 249/129; 249/134

(58) Field of Classification Search ................. 249/122, 249/129, 134, 121; 52/103
See application file for complete search history.

(56) References Cited

U.S. PATENT DOCUMENTS

| | | | |
|---|---|---|---|
| 35,978 A * | 7/1862 | Smith et al. | |
| 267,206 A * | 11/1882 | Hoopes | 40/124.5 |
| 744,056 A * | 11/1903 | Emerson | 52/103 |
| 1,035,260 A * | 8/1912 | Stobbe et al. | 52/103 |
| 1,397,483 A * | 11/1921 | Brown | 52/103 |
| 1,531,109 A * | 3/1925 | Lemmon | 249/114.1 |
| 2,248,866 A * | 7/1941 | Hall | 52/103 |
| 2,421,535 A * | 6/1947 | Bailey | 249/1 |
| 3,329,749 A * | 7/1967 | Elet | 264/45.5 |
| 3,515,779 A * | 6/1970 | Jones | 264/41 |
| 3,798,855 A | 3/1974 | Walker | 52/103 |
| 3,857,214 A * | 12/1974 | Hedges | 52/103 |
| 4,054,000 A | 10/1977 | Lisle | 40/124.5 |
| 4,227,325 A | 10/1980 | Whitford | 40/124.5 |
| 4,463,527 A | 8/1984 | Schlosser | 52/103 |
| 5,014,472 A | 5/1991 | Svensson | 52/103 |
| 5,393,253 A | 2/1995 | Humble et al. | 441/32 |
| 5,517,790 A | 5/1996 | Jennings | 52/103 |
| 5,546,710 A * | 8/1996 | Barry | 52/104 |
| 5,904,008 A | 5/1999 | Frank | 52/103 |
| 6,173,539 B1 | 1/2001 | Barnes | 52/103 |
| 6,295,705 B1 | 10/2001 | Gersten | 27/1 |
| 6,341,437 B1 | 1/2002 | Heiling et al. | 40/124.5 |
| 6,729,078 B2 | 5/2004 | Vrhel | 52/103 |
| 7,144,201 B2 | 12/2006 | DeArmond, Jr. | 405/286 |

\* cited by examiner

*Primary Examiner* — Robert B Davis

(57) ABSTRACT

This monument mold is made of Styrofoam (polystyrene) in the shape of a headstone and base that cement can be poured into in order to provide a tombstone for a person's loved one at an affordable cost, if funds are limited or not available. Being made from a lightweight product, Styrofoam (polystyrene), this product can also be inexpensive to put on the market and can also be offered by retail stores without the heavy and expensive expensive problems that exist with conventional gravestones.

2 Claims, 7 Drawing Sheets

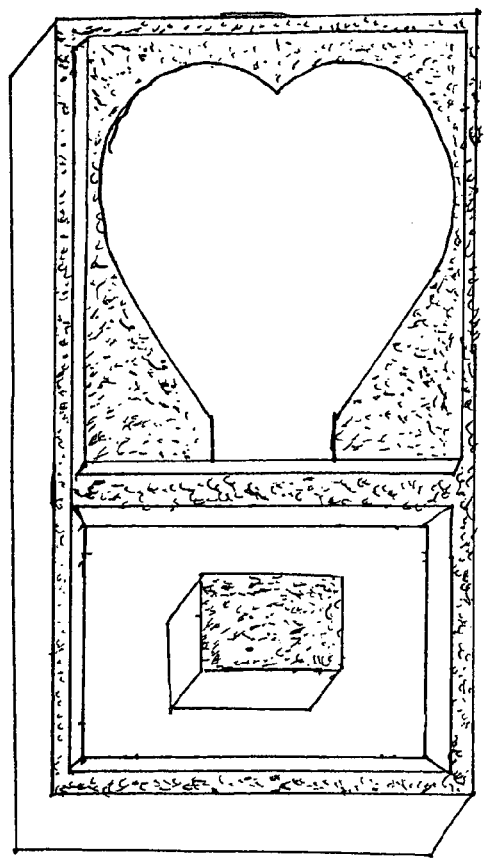
FIG. 2
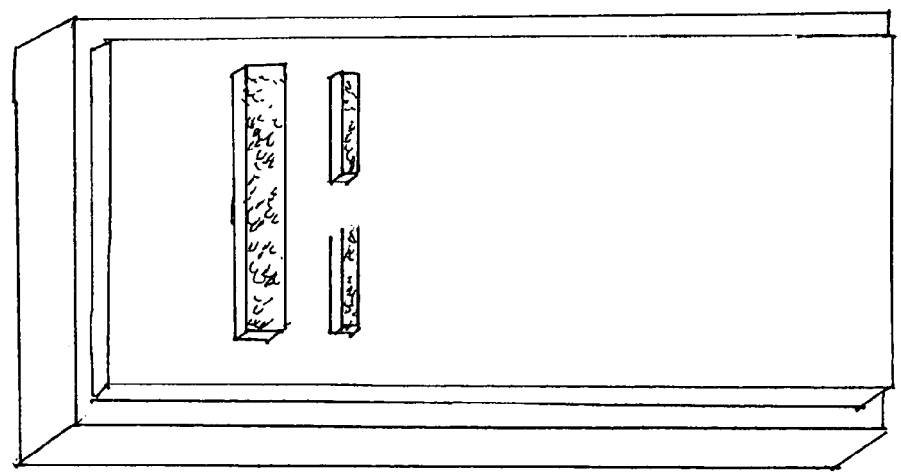

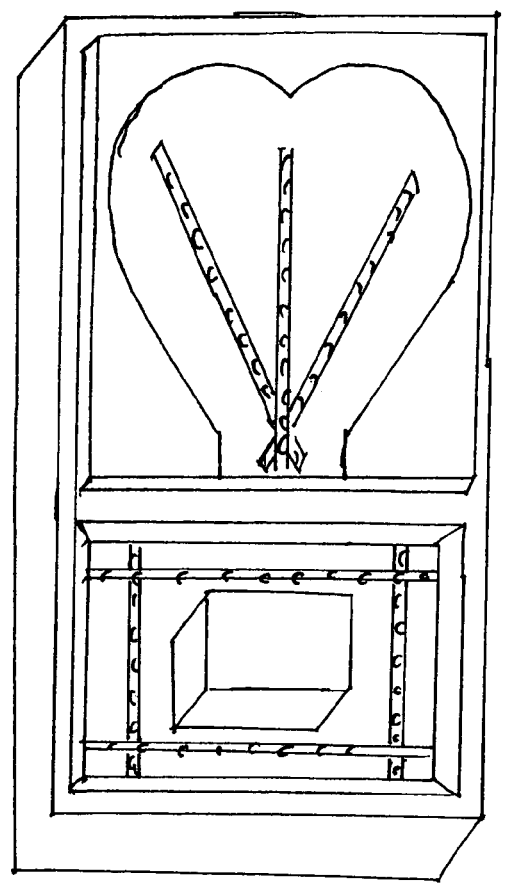
Fig. 3
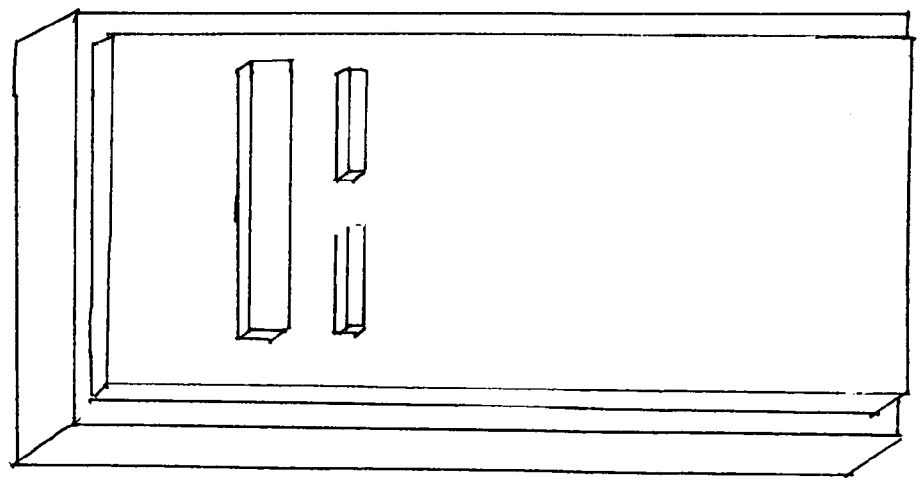

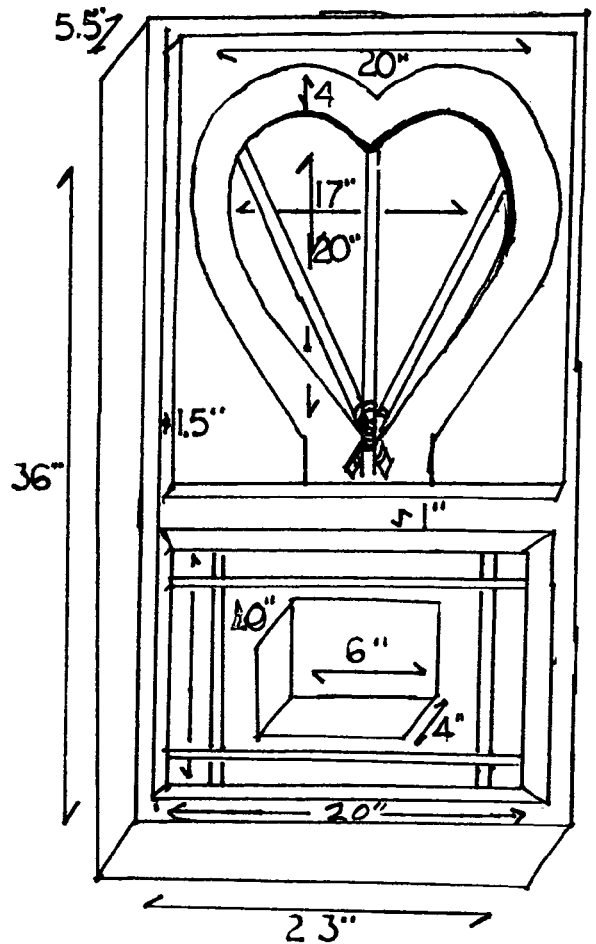
FIG. 4
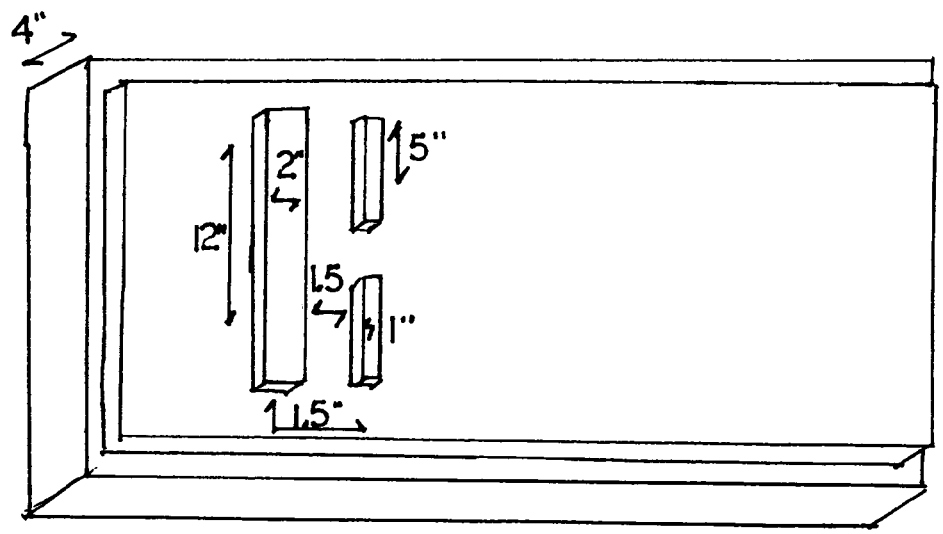

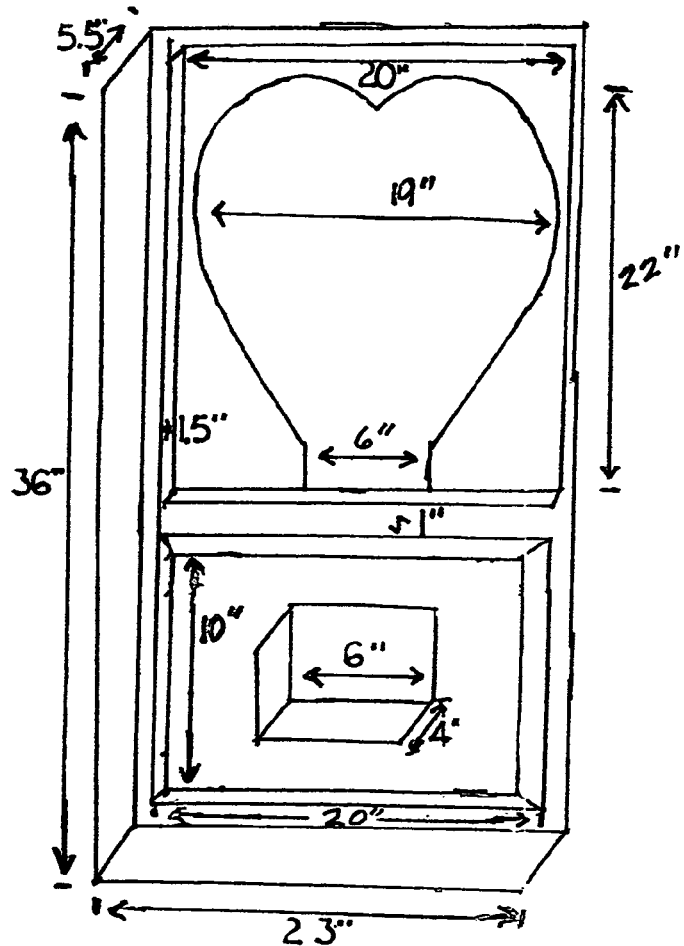
FIG. 4(A)
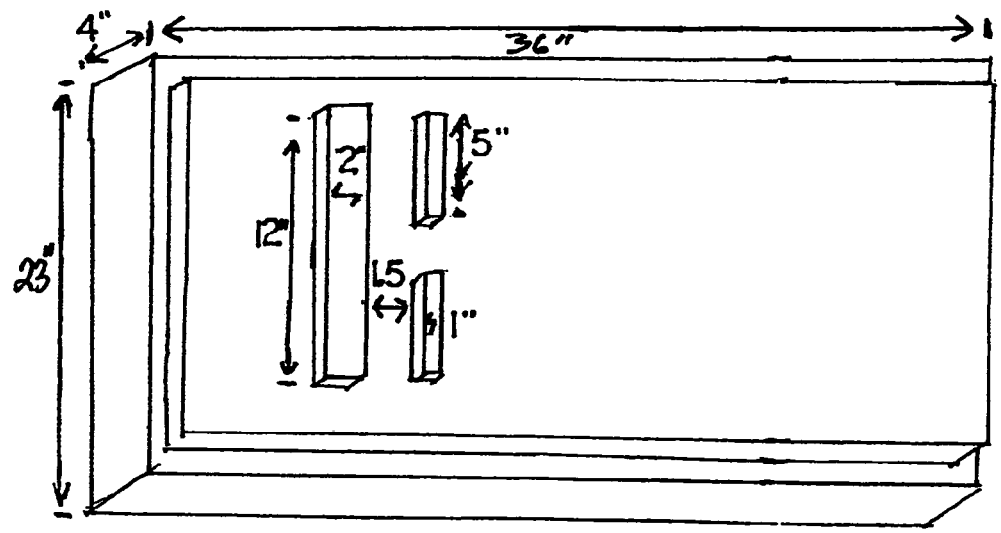

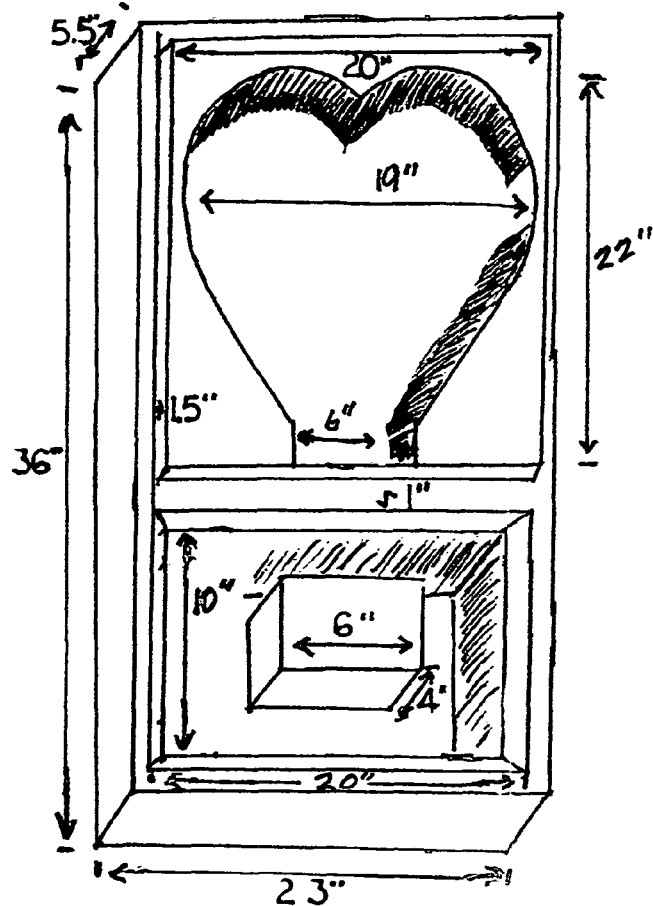
FIG. 4(B)
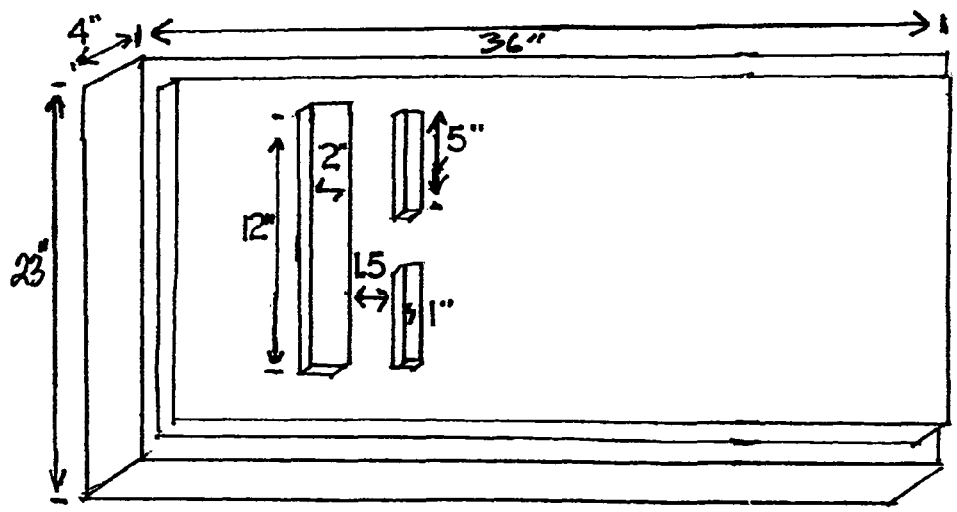

D.I.Y. (DO IT YOURSELF) MONUMENT MOLD

This invention relates to a tombstone or grave marker. This D.I.Y. Monument is made with the intent to provide an inexpensive method in which a loving, caring person can provide a tombstone for a loved one, at very little expense.

This tombstone mold can be filled with cement and re-bar, as per directions, and assembled after cement has cured for 72 hours. The primary objective of this invention is to fill a need of an inexpensive way for people with limited funds to mark a loved one's grave.

A Styrofoam (polystyrene) box with areas in the shape of a heart measuring 22"×20"×4", with a tab at it's base 6"×4" that fits into a hole 6"×4" at the center of a base that is 10'×20'×4" in depth.

The box is actually a mold in the shapes listed above. However the shapes of the molds can be changed within the scope of the claims.

BRIEF DESCRIPTION OF THE DRAWING

FIG. 2 Shows the mold with headstone and base plus the cover lid to the mold. The lid has sections that will indent a cement filled mold to provide an area to place name and birth/death dates.

FIG. 3 Shows the mold with ½" steel dowels (rebar) placed in mold to add strength. Assembly instructions will direct that the rebar be placed in mold after mold is half full of cement.

FIG. 4 Shows the mold and lid cover with all the measurements of inside and outside dimensions.

FIG. 4 (*a*) Shows FIG. 4 with ½" steel dowel rebar deleted.

FIG. 4 (*b*) Shows FIG. 4 with shading added to show depth

Figure 1:
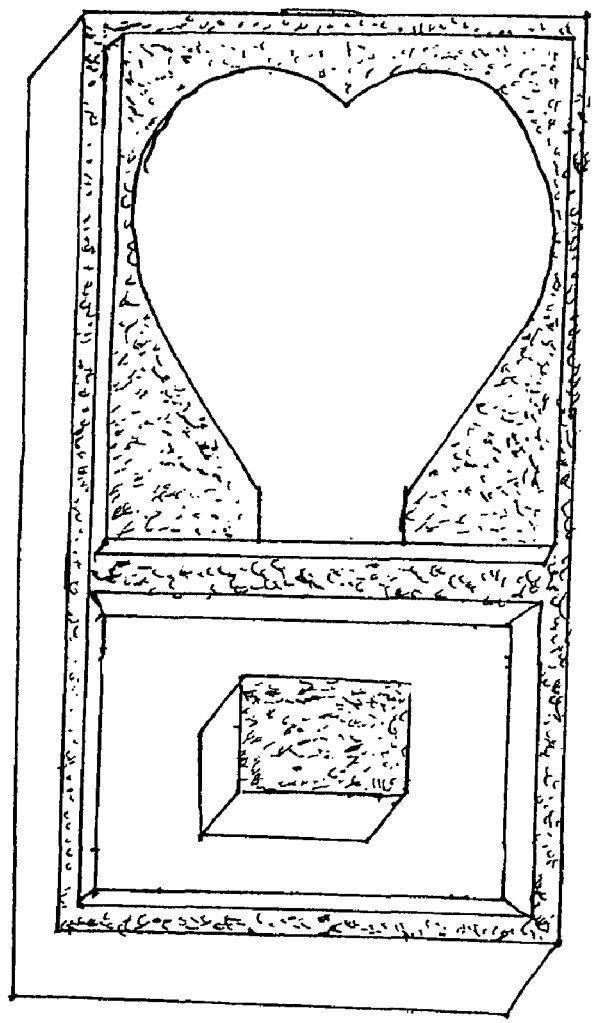
FIG. 1 is the basic mold which includes the headstone section and the base section. The shaded area represents the areas filled with Styrofoam. The other areas are intended to be filled with cement to produce the finished product.
Figure 5:
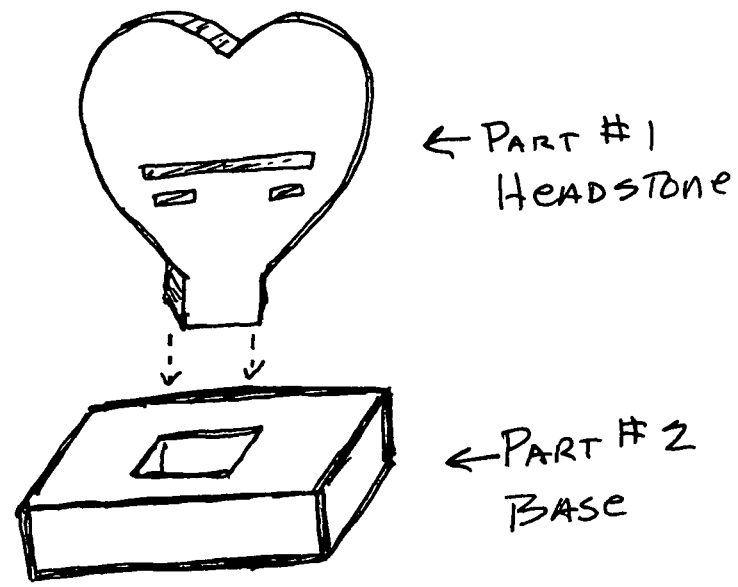
FIG. 5 Shows the finished parts 1 and 2 after being removed from the mold but prior to being connected.
Figure 6:
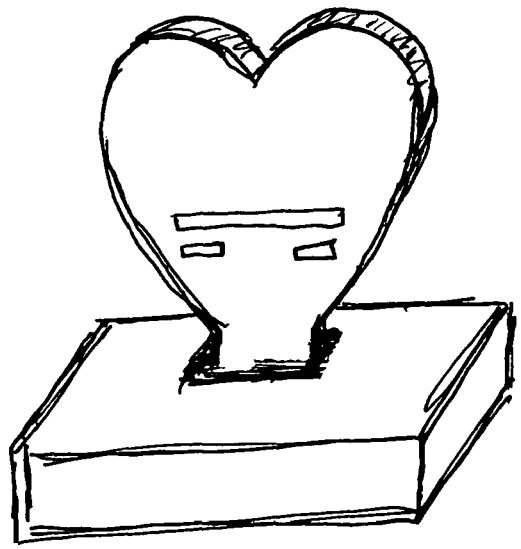
FIG. 6 Is a view of the finished product after part 1 is connected to part 2.

This monument mold is made from Styrofoam (polystyrene) in the shape of a headstone and base to provide a lightweight mold that cement can be poured into. After allowing three (3) days for the cement to cure, the monument can be assembled at the gravesite by placing the headstone on top of the base, without any tools or bolts, for supporting the headstone above ground. See FIG. 1. The mold can then be discarded. The mold is lightweight and can be made in high volume as is shipping containers and boxes. It can also be very cost effective for the loved ones with limited budgets. The base has a recessed area and the bottom of the headstone has an appendage that slides into it, forming a single unit. See FIG. 7.

Both the monument and the base have steel re-bar in them to provide for a stronger unit. See FIG. 4. The headstone has an indentation of a 3" height by 18"width to install a nameplate. Placed under this is an indentation of 2" height by 18" width to install the birth and death dates. See FIGS. 8 and 9.

The invention claimed is:

1. A do it yourself monument mold kit comprising: an outer shipping package having a disposable polystyrene mold having a first cavity and an adjacent second cavity; and a polystyrene lid; wherein the first cavity is in the shape of a monument with a bottom appendage and the second cavity is in the shape of a base with a recessed area therein such that the bottom appendage of the monument fits within the base.

2. The do it yourself monument mold of claim 1, wherein the lid has two protrusions to form two indents in the monument.

* * * * *